(12) United States Patent
Goyal et al.

(10) Patent No.: US 10,131,051 B1
(45) Date of Patent: Nov. 20, 2018

(54) ANTICIPATION-BASED ROBOTIC OBJECT GRASPING

(71) Applicant: Amazon Technologies, Inc., Seattle, WA (US)

(72) Inventors: Dushyant Goyal, Redmond, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 94 days.

(21) Appl. No.: 15/236,225

(22) Filed: Aug. 12, 2016

(51) Int. Cl.
*B25J 9/00* (2006.01)
*B25J 9/16* (2006.01)

(52) U.S. Cl.
CPC .......... *B25J 9/1612* (2013.01); *B25J 9/1697* (2013.01); *G05B 2219/37002* (2013.01); *G05B 2219/39476* (2013.01)

(58) Field of Classification Search
CPC .... Y10S 901/01; Y10S 901/03; Y10S 901/31; Y10S 901/46; Y10S 901/02; B25J 9/1671; B25J 9/1694; B25J 9/0084; B25J 11/0005; G06K 9/6255; G06K 9/66; G06K 9/00201; G06K 9/4604; B65G 47/46; B65G 47/50; B65G 61/00; G06T 17/00; G06T 7/593; G06T 7/60

USPC ...... 700/248, 257, 259; 901/31, 47; 382/155
See application file for complete search history.

(56) References Cited

U.S. PATENT DOCUMENTS

| | | | | |
|---|---|---|---|---|
| 9,333,649 | B1 * | 5/2016 | Bradski | .................... B25J 9/163 |
| 2007/0239315 | A1 * | 10/2007 | Sato | ....................... B25J 9/1612 |
| | | | | 700/245 |
| 2013/0184870 | A1 * | 7/2013 | Ota | ........................ B25J 9/1669 |
| | | | | 700/262 |
| 2013/0238124 | A1 * | 9/2013 | Suzuki | ..................... B25J 9/16 |
| | | | | 700/250 |

* cited by examiner

*Primary Examiner* — Dalena Tran
(74) *Attorney, Agent, or Firm* — Kilpatrick Townsend & Stockton LLP

(57) ABSTRACT

A grasp management system is described. The grasp management system may be configured to determine a grasp strategy for a robotic manipulator. Information about an initial state of an object may be accessed. Information about a final state of the object may also be accessed. The final state may enable a subsequent interaction with the object. An anticipated pose space may be determined that enables the subsequent interaction with the object. An initial pose for the robotic manipulator may be determined based at least in part on the anticipated pose space. The initial pose may be used by the robotic manipulator to grasp the object.

20 Claims, 8 Drawing Sheets

ANTICIPATION-BASED ROBOTIC OBJECT GRASPING

BACKGROUND

Many modern day industries are beginning to rely more and more on robotic manipulators such as robotic arms. These robotic manipulators may function to increase repeatability of tasks, increase efficiency of production lines, and bring other benefits to their operators. Conventionally, robotic manipulators may be trained to grasp and move objects through manual operation by human operators. Some training may also be performed by ingesting data describing how similar robotic manipulators successfully grasped different objects.

Under operational conditions, a robotic manipulator identifies an object and relies on its earlier learning to select an appropriate grasp for grasping and moving the object. This typically may include decomposing the object to one of a set of geometric primitive shapes (e.g., squares, rectangles, cylinders, etc.) and selecting a trained grasp associated with one of the primitives. This approach is sometimes referred to as an affordance-based approach. Depending on the complexity and orientation of the object, this approach can be resource and time intensive. For example, the robotic manipulator (e.g., a computer that manages the robotic manipulator) may be required to evaluate a large set of possible grasps to identify the appropriate grasp. In addition, this approach focuses primarily on the appropriate grasp, which may or may not consider downstream processes relating to the object (e.g., grasping and movement by a second robotic manipulator at a later time). Because of these reasons, other systems that rely on the object being removed may be impacted and the benefits of the robotic manipulator may be minimized.

BRIEF DESCRIPTION OF THE DRAWINGS

Various embodiments in accordance with the present disclosure will be described with reference to the drawings, in which.

DETAILED DESCRIPTION

Figure 1:
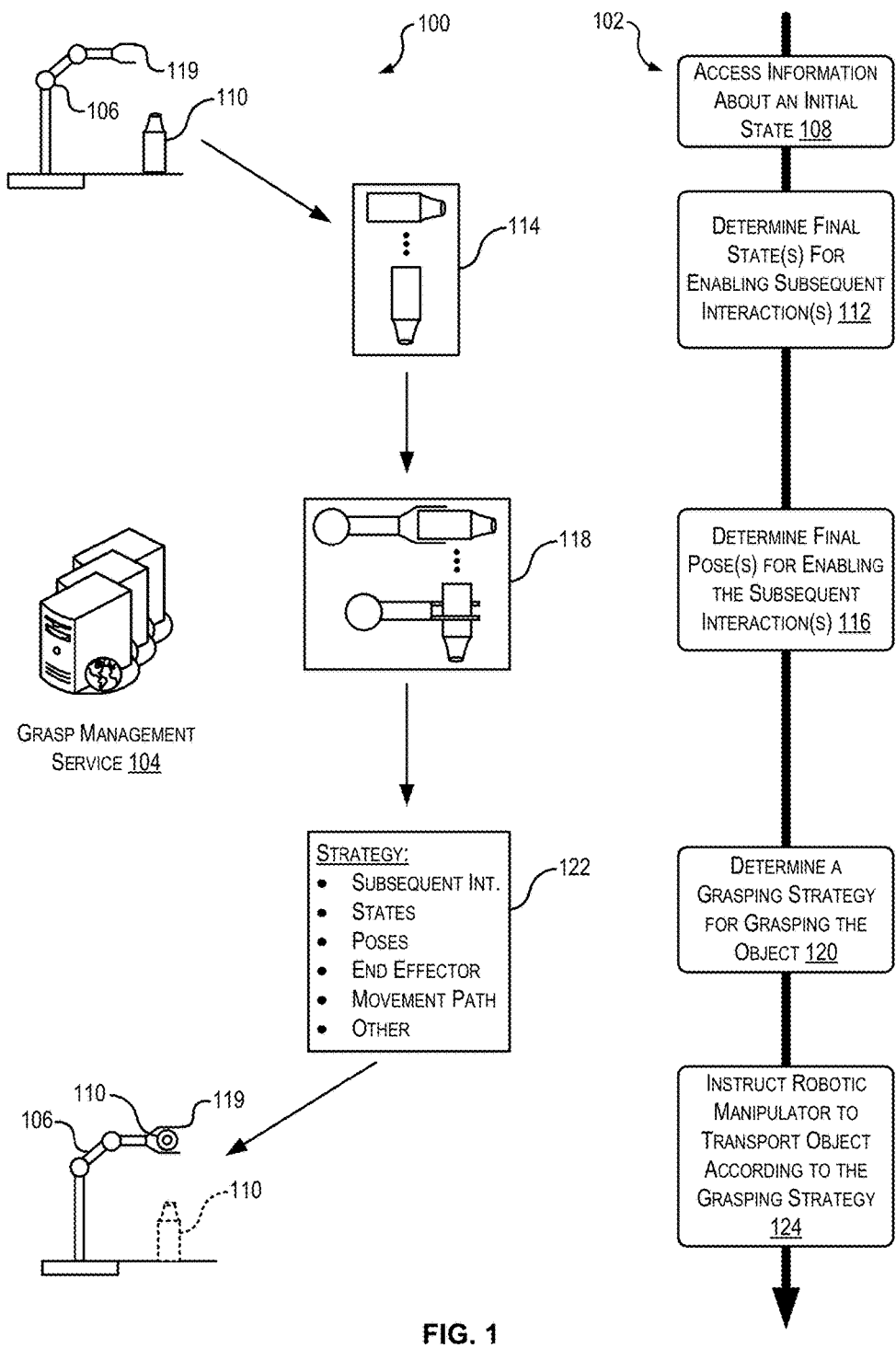
FIG. 1 illustrates an example block diagram depicting an example flow for determining anticipation-based grasping strategies, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Examples described herein are directed to techniques for determining anticipation-based grasping strategies for robotic manipulators such as robotic arms. In particular, the techniques are directed to determining a grasping strategy for an object that anticipates and enables a future state (e.g., a position, a future interaction, etc.) of the object. The future state can include a future use, future placement, and/or future goal of the object, while still held by the robotic manipulator or released, and/or other downstream interactions (e.g., picking of the object by a second robotic manipulator). Information about the future state may be shared with the robotic manipulator or the robotic manipulator may predict the future state based on learned behavior. By anticipating the future state, the robotic manipulator is able to more efficiently determine an appropriate grasping strategy for picking up and moving the object as compared to affordance-based approaches. This may be because, while determining the grasping strategy, the robotic manipulator is able to ignore manipulator poses (e.g., position and orientation of the manipulator), grasps (e.g., position on the object where an end effector can using a grasping function to pick up the object), and movements (e.g., a series of translations and/or rotations performed by the manipulator at different velocities) that would not enable the future state. In some examples, this may drastically reduce the number of poses, grasps, and movements to be evaluated for the object, which may result in time and computational savings. These time and computational savings may result in increased throughput as compared to conventional approaches.

In a particular example, a grasping strategy for a tea kettle may be determined. Initially, the tea kettle and its initial state may be identified (e.g. its orientation, location, size, etc.). Using information about the tea kettle, a set of possible future states and/or interactions may be determined. For example, future interactions can include pouring liquid out of the tea kettle's spout or pouring liquid out its top opening. In any event, determining how to initially pick up and move the object can be performed in a way that enables at least one of these futures interactions. For example, a possible grasp that grasps the kettle by the spout may enable pouring liquid out of the top, but not the spout. Thus, this grasp may be given low preference. Similarly, a possible grasp that grasps the kettle by a lid on the opening may not enable either future interactions. Thus, this grasp may be given even lower preference or even eliminated from a set of possible grasps. However, a possible grasp that grasps the kettle by a handle may enable both pouring liquid out of the spout and the top opening. Thus, this grasp may be given higher preference. To enable the actual pouring in one or both interactions (e.g., rotation of the kettle toward the spout and/or upside down), the robotic manipulator must initially grasp the kettle in a manner that allows for the subsequent rotation. Thus, an initial pose of the robotic manipulator is determined to ensure that the robotic manipulator can use its known degrees of freedom to achieve the future state (and future interaction). Similarly, intermediate poses are determined to ensure that the robotic manipulator does not move the kettle through intermediate states that are undesirable (e.g., pouring out the liquid prior to a final state where a cup is set to receive the liquid). An end effector capable of achieving the future interaction may also be selected. Information about the grasp, the end effector, the poses, and the movements can form the grasping strategy, which can be shared with the robotic manipulator for execution.

Turning now to the figures, FIG. 1 illustrates a simplified block diagram 100 depicting an example process 102 for determining anticipation-based grasping strategies, according to at least one example. The techniques described herein determine grasping strategies for grasping objects based on end goals, end uses, and/or end states of the objects. In this manner, the techniques attempt to anticipate these future states and account for them in grasp strategy generation (e.g., the process of determining how to properly grasp and move an object).

The diagram 100 includes a grasp management service 104 that performs at least a portion of the process 102. The grasp management service 104, as described herein, can include any suitable combination of local or networked computing devices configured to communicate with a robotic manipulator 106 (e.g., Cartesian robot, cylindrical robot, spherical robot, articulated robot, parallel robot, SCARA robot, anthropomorphic robot, and any other suitable robotic manipulator and/or robotic arm). Such communication can take place over one or more networks as described with reference to FIG. 2. In some examples, the grasp management service 104 is configured to generate instructions for execution by the robotic manipulator 106.

The process 102 may begin at 108 by accessing information about an initial state. The initial state belongs to an object 110 disposed adjacent to the robotic manipulator 106. The object 110 can be any suitable object capable of being interacted with by the robotic manipulator 106 (e.g., books, packages, electronic devices, furniture, clothing, bedding, dishes, cleaning supplies, outdoor equipment, toys, jewelry, shoes, sporting equipment, home devices, pet supplies, etc.). For example, the object 110 can be any of these objects stored in an inventory system. In the illustrated example, the object 110 is a bottle. The information accessed at 108 may indicate one or more characteristics of the object 110, which can include, for example, a position and an orientation with respect to the robotic manipulator 106, dimensions, weight, volume, surface characteristics, anticipated uses, grasping rules, placement rules, and other similar characteristics.

The information accessed at 108 may indicate that, in its initial state, the object 110 is located at a particular distance from the robotic manipulator 106 (e.g., expressed in any suitable manner including, for example, Cartesian coordinates, polar coordinates, and the like), that the object 110 is standing upright with its opening facing up. In some examples, the information accessed at 108 may be associated with the actual object 110. For example, the information may be derived from one or more images captured by an image capture device that depicts the actual object 110. The images may be captured by the image capture device as the object 110 is located adjacent to the robotic manipulator 106. For example, the image capture device may be included with the robotic manipulator 106. In some examples, the information accessed at 108 may also be derived from a database that stores information about the object 110. The databases may be associated with the grasp management service 104. The information may identify one or more characteristics of the object 110 or objects sharing the same object class as the object 110 (e.g., dimensions, weight, volume, anticipated uses, grasping rules, placement rules, etc.). In some examples, the information accessed at 108 may be provided to the grasp management service 104. For example, all objects like the object 110 may be placed in front of the robotic manipulator 106 at the same location. In this manner, the robotic manipulator 106 may be able to manipulate the object 110 without capturing live images of the actual object 110.

At 112, the process 102 determines final state(s) 114 for enabling subsequent interaction(s) with the object 110. The final states 114 may be later states of the object 110. The final states 114 correspond to possible positions and orientations of the object 110 that may be different than the initial state. The final states 114 correspond to subsequent interactions that could take place with the object 110 when it is in one of the final states 114. For example, a subsequent interaction for the object 110 can include a subsequent use of pouring liquid out of the top of the object 110. An example final state of the object 110 that can correspond to the subsequent use of pouring liquid can include a state in which the object 110 is rotated 180 degrees from its initial state. In this example final state, the subsequent use of pouring liquid would be enabled. In another example, a subsequent interaction for the object 110 can include a subsequent goal of storing the object 110 on its side in a bin. An example final state of the object 110 that can correspond to the subsequent goal of storing the object 110 on its side in a bin can include a state in which the object 110 is rotated 90 degrees from its initial state. In this example final state, the subsequent goal of storing the object 110 on its side in a bin would be enabled. As illustrated by the final states 114, many different final states corresponding to many different subsequent interactions can be determined. In some examples, a single final state may enable multiple subsequent interactions. Likewise, a single subsequent interaction may be enabled by multiple final states.

At 116, the process 102 determines final pose(s) 118 for enabling the subsequent interaction(s). In some examples, the final pose(s) are selected in a manner to achieve the final states 114 of the object 110. The final poses 118 may belong to the robotic manipulator 106 and may indicate at least a position and an orientation of a part of the robotic manipulator 106 (e.g., an end effector 119, a joint, etc.). In some examples, the robotic manipulator 106 may have many degrees of freedom. In which case, the final pose 118 may identify a position and an orientation for more than one part of the robotic manipulator 106. The final poses 118 may be determined in a manner that enables the subsequent interactions. Continuing with the example from above, if the subsequent interaction includes a subsequent use of pouring liquid from the object 110, the final pose may include a pose in which the object 110 is held with its opening facing down. This may enable the robotic manipulator 106 to pour liquid from the opening. Again, continuing with the earlier example, if the subsequent interaction includes a subsequent goal of placing the object 110 on its side in a bin, the final pose may include a pose in which the object 110 is held by its bottom and rotated 90 degrees from its initial state. This may enable the robotic manipulator 106 to place the object 110 in the bin.

In some examples, the final states 114 may correspond directly to the final poses 118. For example, each final state 114 may correspond to a final pose 118 that achieves each respective final state 114. In some examples, certain final states 114 may be achievable by more than one of the final poses 118.

At 120, the process 102 determines a grasping strategy 122 for grasping the object 110. The grasping strategy 122 may include information about the subsequent interaction(s) to be enabled, initial and final states of the object 110, initial and final poses of the robotic manipulator 116, end effector(s) 119 of the robotic manipulator 106, a movement path for the robotic manipulator 106 and/or end effector 119, and other information. The movement path can include one or more intermediate poses of the robotic manipulator 106 to move from the initial pose to one of the final poses. Part of determining the grasping strategy may include iteratively evaluating each intermediate pose (e.g., movement step of at least one joint of the robotic manipulator 106) to ensure that it (and subsequent intermediate poses) enables the final state(s) and/or the subsequent interaction. Thus, determining the grasping strategy may include recursively evaluating intermediate poses possible for all degrees of freedom of the robotic manipulator 106 between an initial pose(s) and the final pose(s). The sampling rate for evaluating the intermediate poses may be selected as appropriate based on the robotic manipulator 106, the object 110, and the subsequent interactions to enable. For example, if the object 106 is highly fragile, a finer sampling rate (e.g., smaller movements and rotations) may be used to ensure that the movements are overly swift. The other information can include, for example, parameters relating to the movement path (e.g., movement velocity, end effector contact pressure, etc.) and any other information for enabling the robotic manipulator to manipulate the object 110. Determining the grasping strategy 122 can also include searching feasible grasps within a movement space that is constrained by the final poses 118. In this manner, the grasping strategy 122 may be determined in a manner that requires less computational resources and is faster than conventional methods.

At 124, the process 102 instructs the robotic manipulator 106 to transport the object 110 according to the grasping strategy 122. This can include providing the grasping strategy 122 to the robotic manipulator 106, which is configured to execute the grasping strategy 122. This may also include converting the grasping strategy 122 to a format readable by the robotic manipulator 106 prior to the transfer. Transporting the object 110 according to the grasping strategy 122 may include translating, rotating, or otherwise moving the object 110 from the initial state (illustrated in a dashed line with respect to 124) to the final state (illustrated as being grasped by the end effector 119).

Figure 2:
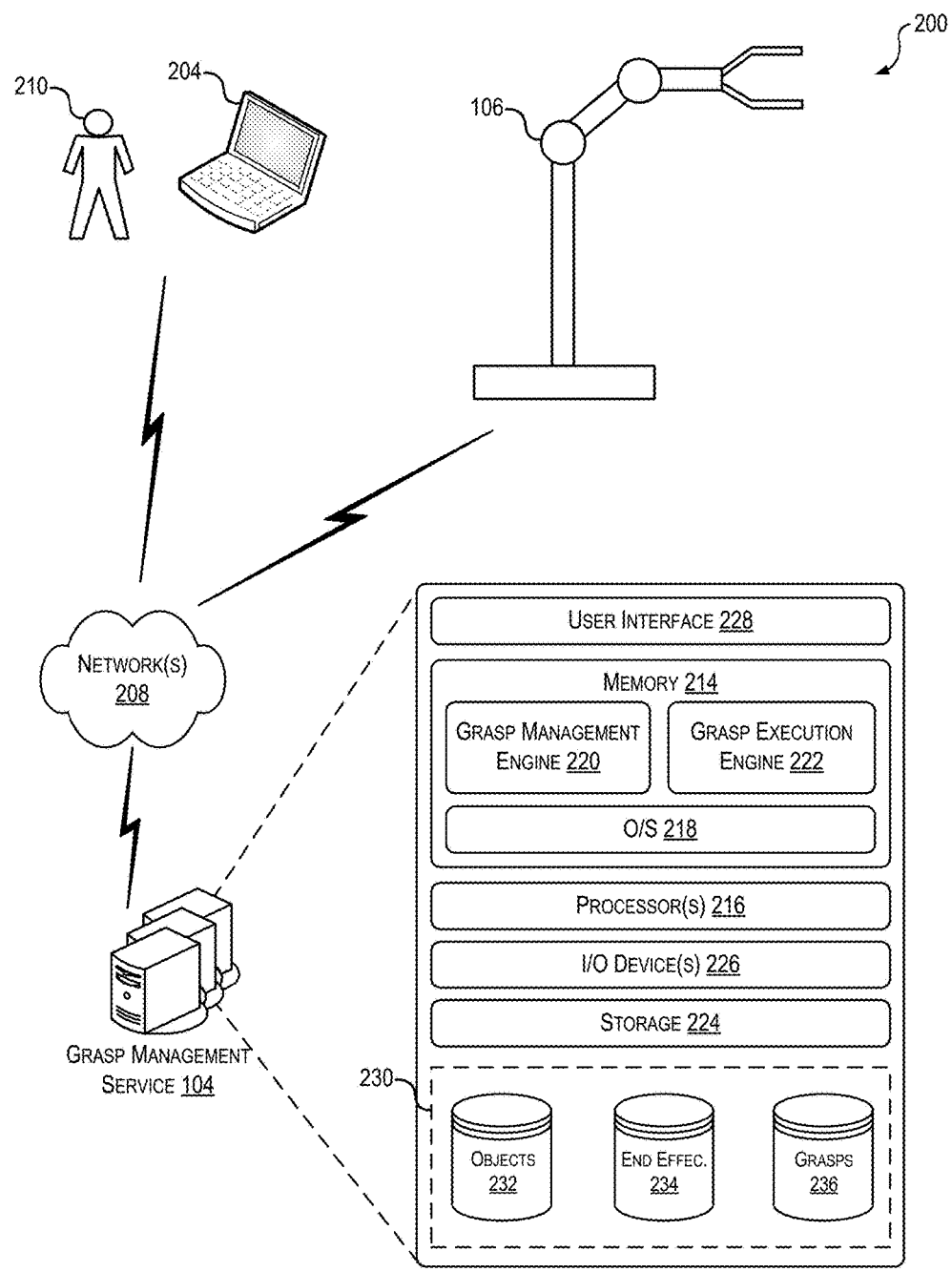
FIG. 2 illustrates an example architecture or system for determining anticipation-based grasping strategies, according to at least one example.

FIG. 2 illustrates an example architecture 200 for implementing techniques relating determining anticipation-based grasping strategies, according to at least one example. The architecture 200 may include the grasp management service 104 in communication with a user device 204 and the robotic manipulator 106 via one or more networks 208 (hereinafter, "the network 208"). The user device 204 may be operable by a user 210 to interact with the grasp management service 104 and/or the robotic manipulator 106. The user 210 may use the user device 204 to connect to and control the robotic manipulator 106, for example, to teach the robotic manipulator 106 to pick up objects. In some examples, the grasp management service 104 provides a user interface that enables the user 210 utilizing the user device 204 to operate the robotic manipulator 106. The network 208 may include any one or a combination of many different types of networks, such as cable networks, the Internet, wireless networks, cellular networks, and other private, and/or public networks.

The user device 204 may be any suitable type of computing device such as, but not limited to, a tablet, a mobile phone, a smart phone, a personal digital assistant (PDA), a laptop computer, a desktop computer, a thin-client device, a tablet computer, or any other suitable device capable of communicating with the grasp management service 104 and/or the robotic manipulator 106 via the network 208 in accordance with techniques described herein.

The robotic manipulator 106 may include any suitable type and number of sensors disposed throughout the robotic manipulator 106 (e.g., sensors in the base, in the arm, in joints in the arm, in the end effector 119, or in any other suitable location). The sensors can include sensors configured to detect pressure, force, weight, light, objects, slippage, and any other information that may be used to control and/or monitor the operation of the robotic manipulator 106, including the end effector 119. The sensors may be in communication with a management device that is local to the robotic manipulator and/or may be in direct communication with the grasp management service 104. In this manner, the management device may control the operation of the robotic manipulator 106 and the end effector 119 based at least in part on sensing information received from the sensors. The sensing information may also be used as feedback to adjust the grasps used by the end effector 119, to generate new grasps, to validate grasps, and to determine quality values for grasps, which may have numerical values based at least in part on one or more objective factors.

The grasp management service 104 may include one or more server computers, perhaps arranged in a cluster of servers or as a server farm. These servers may be configured to perform computing operations as described herein. In some examples, the servers (and the components thereof) may be distributed throughout more than one location. The servers may also be virtual computing resources. The grasp management service 104 may be implemented as part of an inventory management system that is associated with an electronic marketplace. Through the electronic marketplace users may place orders for items. In response, the inventory management system may determine shipping instructions for retrieving the items from their physical storage locations and coordinating their shipping. In some examples, the shipping instructions may be based on the inventory packing instructions. For example, a retrieval portion of the shipping instructions may include an inventory mapping of the packing locations for the items. The retrieval portion may be provided to the robotic manipulator 106 for retrieval of the items. For example, the items may be retrieved from a storage structure and placed on a conveyor system or in a separate storage structure. As the robotic manipulator 106 retrieves items as part of customer orders or otherwise, success metrics may be gathered and used to improve the set of grasps attempted by the robotic manipulator 106 as part of retrieving the items or otherwise operating under actual operating conditions. In some examples, the grasp management service 104 may be implemented as a service within the inventory management system. In this manner the grasp management service 104 can access components of the inventory management system and easily share information with the inventory management system.

Examples of storage structures can include moveable storage structures coupled to mobile drive units, fixed storage structures, and any other structure capable of retaining objects. In some examples, the storage structure may include a plurality of bins from which objects may be removed by the robotic manipulator 106 and/or to where objects may be placed by the robotic manipulator 106. The robotic manipulator 106 may also be configured to remove objects from conveyance structures and place objects on conveyance structures.

The grasp management service 104 may include at least one memory 214 and one or more processing units (or processor(s)) 216. The processor 216 may be implemented as appropriate in hardware, computer-executable instructions, software, firmware, or combinations thereof. Computer-executable instruction, software, or firmware implementations of the processor 216 may include computer-executable or machine-executable instructions written in any suitable programming language to perform the various functions described. The memory 214 may include more than one memory and may be distributed throughout the grasp management service 104. The memory 214 may store program instructions that are loadable and executable on the processor(s) 216, as well as data generated during the execution of these programs. Depending on the configuration and type of memory including the grasp management service 104, the memory 214 may be volatile (such as random access memory (RAM)) and/or non-volatile (such as read-only memory (ROM), flash memory, or other memory). The memory 214 may include an operating system 218 and one or more application programs, modules, or services for implementing the features disclosed herein including at least a grasp management engine 220 and a grasp execution engine 222. As described in detail herein, the grasp management engine 220 may be configured to generate grasp strategies. The grasp execution engine 222 may be configured to instruct one or more robotic manipulators 106 to execute grasp strategies that have been generated as described herein. In some examples, the management device includes the same or similar functionality as the grasp management service 104. For example, the management device may include an engine comparable to the grasp management engine 220 and an engine comparable to the grasp execution engine 222.

The grasp management service 104 may also include additional storage 224, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 224, both removable and non-removable, are examples of computer-readable storage media, which may be non-transitory. For example, computer-readable storage media may include volatile or non-volatile, removable or non-removable media implemented in any suitable method or technology for storage of information such as computer-readable instructions, data structures, program modules, or other data. As used herein, modules, engines, and components, may refer to programming modules executed by computing systems (e.g., processors) that are part of the grasp management service 104.

The grasp management service 104 may also include input/output (I/O) device(s) and/or ports 226, such as for enabling connection with a keyboard, a mouse, a pen, a voice input device, a touch input device, a display, speakers, a printer, or other I/O device.

The grasp management service 104 may also include a user interface 228. The user interface 228 may be utilized by an operator or other authorized user to access portions of the grasp management service 104. In some examples, the user interface 228 may include a graphical user interface, web-based applications, programmatic interfaces such as application programming interfaces (APIs), or other user interface configurations. The grasp management service 104 may also include a data store 230. In some examples, the data store 230 may include one or more data stores, databases, data structures, or the like for storing and/or retaining information associated with the grasp management service 104. For example, the data store 230 may include databases, such as an object database 232, an end effector database 234, and a grasp database 236.

The object database 232 may be configured to retain information about objects capable of being grasped by the robotic manipulator 106. The information in the object database 232 may be organized in any suitable manner to enable access by components of the grasp management service 104 such as the grasp management engine 220. For example, the object database 232 may include an entry for each object that the grasp management service 104 may encounter. As a result, the object database 232 may include entries on a scale of hundreds of thousands or even millions. For each entry that corresponds to an object, the object database 232 may include a class identifier that identifies a class of objects to which the respective object belongs (e.g., bottles, square boxes, rectangular boxes, non-uniform boxes, books, televisions, plastic packaged, plush toys, computers, etc.), an object identifier that uniquely identifies the object (e.g., identifies a particular bottle of soda of brand A with respect to other bottles of soda of brand A) or uniquely identifies a subclass of the object (e.g., identifies an object as belonging to a subclass of brand A bottles in the class of bottles), possible end states of the object, affordances for the object and/or class of objects, affordances associated with shape primitives that approximate the object, surface characteristics of the object (e.g., rough, slippery, smooth, etc.), and/or any other information. The possible end states may be precomputed based on likely interactions, uses, goals, and/or placements of the object. In some examples, a probability value may be assigned to each end state, which may be computed using a probability distribution function and added to the object database 232. For example, for a container of hand sanitizer that has a pump dispenser, a first state may include the container being positioned upright with the pump dispenser unobstructed, a second state may include the container being positioned upright with the pump dispenser obstructed, a third state may include the container being positioned with the pump dispenser facing downward, etc. Each of the first, second, and third state may be assigned a probability value such as 0.8 for the first state, 0.5 for the second state, and 0.3 for the third state. These values may indicate that the most likely end state for the container of hand sanitizer is the first state.

The object database 232 may also include entries including a description of the object, one or more stock images of the object, a surface model of the object or a link to the surface model of the object, a primitive shape model of the object or a link to the primitive shape object, a bounding box representation of the object, one or more actual images of the object (e.g., taken as it entered a facility), dimensions of the object (e.g., height, width, length), a location of a center of mass of the object, a total weight of the object, a three-dimensional image of the object, information about pose marker fiducials on the object or other identifiers of the object (e.g., unique characteristics of the object) that can be used to determine position and orientation of the object, and any other suitable of information related to the object.

The end effector database 234 may be configured to retain information associated with end effectors and other end of arm tools described herein. In some examples, information stored in the end effector database 234 may be organized according to different categories of end effectors and may include specification information for each end effector. This may include capacities of the end effectors in terms of amount of force, pressure, voltage, current, and geometric constraints, contact point constraints, and any other constraint. Any suitable end effector including any suitable grasping function may be included in the end effector database 234 and may be utilized in accordance with techniques described herein. A grasping function may define functionally how an end effector is capable of manipulating an object. The grasping function may differ between end effectors with respect to capacities, categories, and physical limitations. Example categories of end effectors include: soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferromagnetic particles capable of altering a size or shape of the fluid volume when subjected to a magnetic field). Vacuum end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

The grasp database 236 may be configured to retain information about possible grasps for grasping objects. The grasp database 236 may be configured to retain information about grasps that have been generated, taught, validated, attempted, or otherwise managed as described herein. For each grasp, the grasp database 236 may retain an end effector used for the grasp, an object or feature of an object associated with the grasp, one or more grasping surfaces on the object or feature of the object, contact points within the grasping surfaces where the arm tool may contact the object when executing the grasp, primitive shapes corresponding to features of the object, success rates for the particular grasp, an orientation of the object associated with the particular grasp, an orientation of an end effector with respect to the object associated with the particular grasp, and/or any other suitable information pertaining to a grasp. The grasp database 236 may be made accessible for other robotic manipulators operating under actual conditions. This may be done by making the grasp database 236 accessible via a cloud-based server, networked server, or in any other suitable manner. For example, robotic manipulators that handle inventory in one or more warehouses located throughout a geographic region can access the grasp database 236 simultaneously or copies of the grasp database 236 to search for appropriate grasps based on the conditions they encounter. Storage of the grasp information described herein in the grasp database 236 may improve the functioning of the grasp management service 104 by enabling quicker and more efficient searching of feasible grasps.

Figure 3:
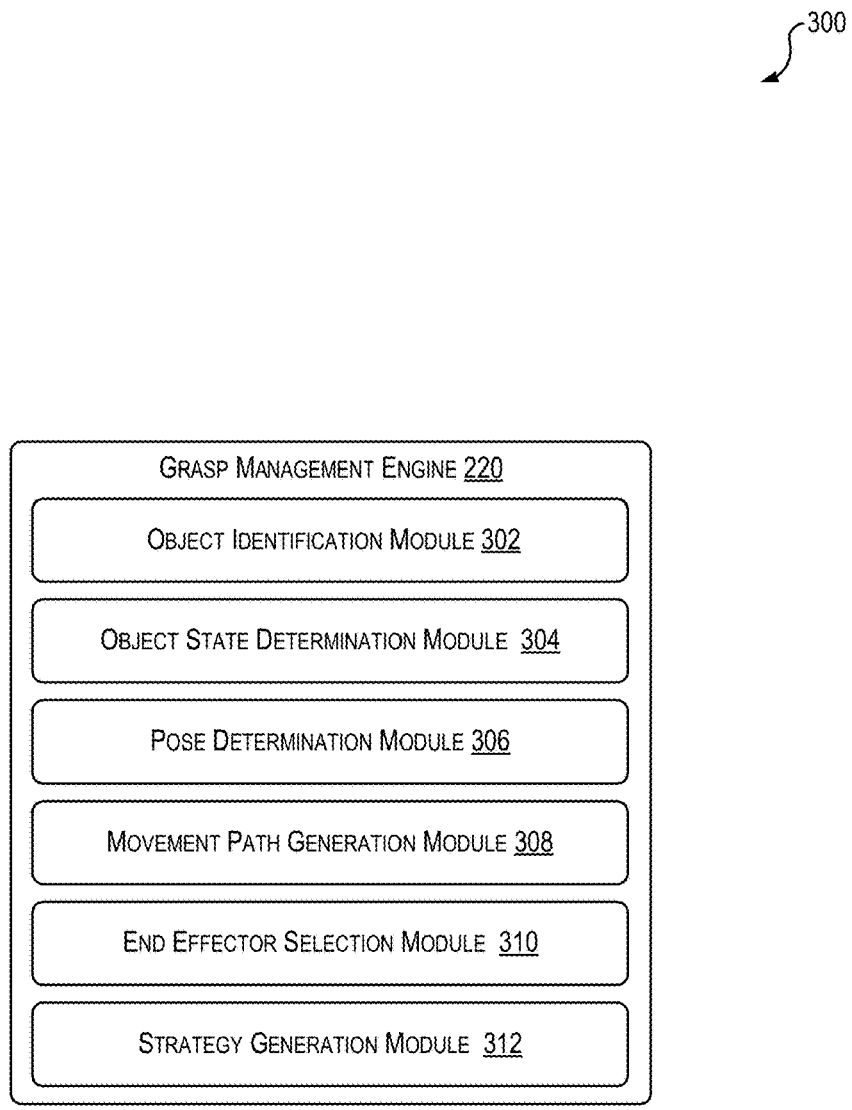
FIG. 3 illustrates an example device for determining anticipation-based grasping strategies, according to at least one example.

FIG. 3 illustrates an example device 300 including the grasp management engine 220. The grasp management engine 220 may be configured to manage one or more sub-modules, components, and/or services directed to examples disclosed herein. In some examples, the grasp management engine 220 may include an object identification module 302, an object state determination module 304, a pose determination module 306, a movement path generation module 308, an end effector selection module 310, and a strategy generation module 312. While these modules are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein.

The object identification module 302 may be configured to access information about objects in the object database 232. This can include, for example, general characteristics of the objects and aspects of the objects that are determined using the techniques described herein. For example, the object identification module 302 may be configured to instruct one or more image capture devices to capture images of an object in order to identify the object from the images. In some examples, the images are provided and the object identification module 302 evaluates the images to identify the object from the images. This can include using any suitable image processing technique capable of detecting objects. In some examples, the object identification module 302 receives sensing information that identifies an object based on the sensing information. For example, a sensor may scan a barcode on the object and barcode information may be used by the object identification module 302 to identify the object.

The object state determination module 304 may be configured to determine state information for objects. The state information may be include initial state information that describes aspects of objects in their initial states (e.g., before they have been interacted with by a robotic manipulator). The state information may also include final state information that describes aspects of objects in their final states (e.g., after they have been interacted with by the robotic manipulator). The state information may also include intermediate state information that describes aspects of objects in states between their initial states and their final states. For example, initial state information for an object may indicate an initial position and an initial orientation of the object with respect to the robotic manipulator. Final state information for the object may indicate a final position and a final orientation of the object with respect to the robotic manipulator. The intermediate states may indicate desirable and undesirable states between the initial states and the final states. In some examples, the intermediate states may include undesirable states. For example, an undesirable state that may result in the object being dropped or which may result in the object being damaged may be determined and avoided. In some examples, at least some of the state information is provided to the object state determination module 304, while at least some of the state information is generated by the object state determination module 304. The state information may depend on subsequent interactions with the object. For example, final states that enable the subsequent interactions may be flagged, assigned a higher probability, and/or otherwise noted.

The pose determination module 306 may be configured to determine pose information for robotic manipulators. The pose information may include initial pose information, intermediate pose information, and final pose information. For a particular robotic manipulator used to manipulate a particular object, final pose information may describe a final pose of the robotic manipulator that will enable a subsequent interaction with the particular object or that at least places the object in a desired final state. Initial pose information may describe an initial pose (e.g., position and orientation) of the robotic manipulator that will enable the robotic manipulator to move the object to the final pose. Intermediate pose information may describe one or more intermediate poses of the robotic manipulator as it moves from the initial pose to the final pose. The intermediate poses can be determined in a manner that avoids moving the object through undesirable intermediate states as determined by the object state determination module 304.

The movement path generation module 308 may be configured to generate movement path information. The movement path information may define parameters of moving an object from an initial state to a final state. The movement path information may also include parameters relating to the movement path (e.g., approach velocity, end effector pressure, removal velocity, angular rotation velocity, and other similar parameters relating to the movement path) and any other information for enabling the robotic manipulator to manipulate the object.

In some examples, the movement path includes a local trajectory (e.g., a set of transformations) according to which an end effector of robotic manipulator will move to move the object from the initial state to the final state and/or to move an initial pose to a final pose. The local trajectory may be learned for different classes of objects. Thus, in some examples, the movement path generation module 308 may determine a movement path based at least in part on the class of object being manipulated. A convolution deep belief network (CDBN) may be used to learn and encode the transformations that make up the local trajectories using any suitable technique. For example, to develop training data, a set of labeled images can be used. The labeled images may include an oriented rectangle highlighting the area or part of the object for grasping and images of the final pose of the object. The goal of the learning may be to predict the oriented rectangle given a new image of the object, either seen before or never seen, for a grasp. By showing an image of a new object, the CDBN anticipates the final pose space, and subsequently predicts the area or part of the object to grasp in order to maximize coverage of the anticipated pose space.

The end effector selection module 310 may be configured to access information about end effectors described herein and select one or more end effectors for manipulating an object. To this end, the end effector selection module 310 may be configured to access the end effector database 234. The end effector selection module 310 may also be configured to access information identifying a particular end effector (or set of end effectors) available to the robotic manipulator to manipulate the object. The end effector selection module 310 may also be configured to determine a set of potential grasps corresponding to a particular end effector. In some examples, this may include accessing a set of predefined grasps that have been computed for the particular end effector. In some examples, this may include computing grasps based on the particular end effector, the object to be grasped, grasping parameters, a subsequent interaction, a final state, and any other suitable information.

The strategy generation module 312 may be configured to generate a grasping strategy based on one or more of the outputs from the other modules 302-310. The grasping strategy may include a set of instructions executable by the robotic manipulator.

Figure 4:
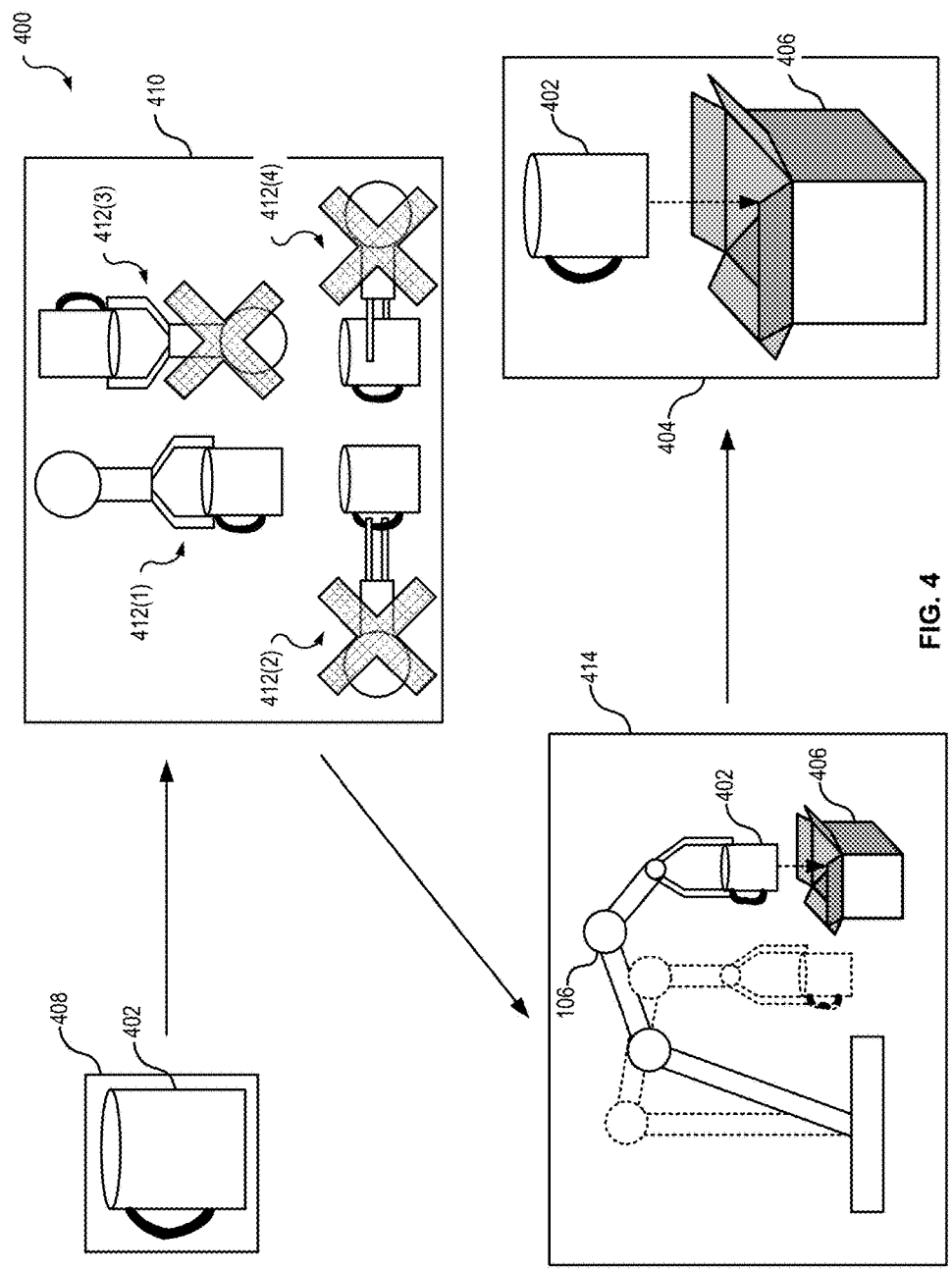
FIG. 4 illustrates an example diagram relating to determining anticipation-based grasping strategies, according to at least one example.

FIG. 4 illustrates an example diagram 400 relating to determining anticipation-based grasping strategies, according to at least one example. In particular, the diagram 400 graphically illustrates a process for determining a grasping strategy for an object 402. The object 402 is an example of the object 110. The strategy is determined in a manner that ensures that an end state of the object 402 and a final pose of the robotic manipulator 106 enable at least one subsequent interaction with the object 402. In this example, the at least one subsequent interaction and end state of the object 402 are shown in box 404. The subsequent interaction includes packing the object 402 into a container 406. The object 402 is shown in an initial state in box 408.

Box 410 includes a final pose space including anticipated final poses 412(1)-412(4) (e.g., positions and orientations) of the robotic manipulator 106 and associated grasps that could be used to grasp the object 402. It should be understood, however, that the final pose space may include greater or fewer anticipated final poses and associated grasps than illustrated. The final pose space may be computed by the grasp management service 104. The final pose space, including the anticipated final poses 412(1)-412(4), may be culled to remove any anticipated final poses 412 that may impede the subsequent interaction, either partially or fully. For example, as illustrated in FIG. 4 by the X's, the anticipated final poses 412(2)-412(4) may be removed because they may impede the subsequent interaction (e.g., do not enable the subsequent interaction). The subsequent interaction includes placing the object 402 right-side up in the container 406. The anticipated final pose 412(2) (e.g., grasping the object 402 by a handle) would not likely result in the object 402 being suitably placed in the container 406. This may be because an end effector of the robotic manipulator 106 would collide with the container 406 prior to releasing the object 402. Similarly, the anticipated final pose 412(3) (e.g., grasping the object 402 from the top and turning it upside down) would not likely result in the object 402 being suitably placed in the container 406. In fact, the anticipated final pose 412(3) may entirely impede the subsequent interaction. Finally, the anticipated final pose 412(4) (e.g., grasping the object 402 from the side) would not likely result in the object 402 being suitably placed in the container 406. This may be because an end effector of the robotic manipulator 106 would collide with the container 406 prior to releasing the object 402.

Culling the final pose space to remove anticipated final poses 412 that impede the subsequent interaction creates an anticipated pose space. The anticipated pose space includes those anticipated final poses 412 that do not impede (e.g., enable) the subsequent interaction. Thus, in this example, the anticipated final pose 412(1) makes up the anticipated pose space. In other examples, greater or fewer anticipated final poses 412 will make up the anticipated pose spaces. The anticipated pose space is used for determining a grasping strategy that maximizes control and manipulator of the object 402. This may include being able to move the object 402 as speedily and precisely as possible.

After the anticipated pose space has been determined (e.g., the final pose space has been culled), movement paths are determined for moving the robotic manipulator from an initial pose corresponding to the object 402 in the initial state to the anticipated final pose 412 from the anticipated pose space corresponding the object 402 in the final state. For example, as illustrated in box 414, the initial pose of the robotic manipulator 106 and the object 402 in its initial state are illustrated in dashed lines. The final pose of the of the robotic manipulator 106 and the object 402 in its final state are illustrated in solid lines. When the robotic manipulator 106 holds the object 402 in it is final state by moving to the final pose, the subsequent interaction of packing the object 402 into the container 406 is enabled. The movement path includes any transformations (e.g., translations and/or rotations) that the robotic manipulator 106 must perform in order to move the object 402 form its initial state to its final state. In some examples, determination of the movement path includes determining an intermediate space through which the robotic manipulator 106 will travel to reach the anticipated final pose 412. This can include a set of intermediate states for the object 402 and a set of intermediate poses for the robotic manipulator 106. Each possible intermediate pose may be evaluated to determine whether it would result in subsequent poses that will ultimately enable the conditions present in the box 404. If a possible intermediate pose will not ultimately enable the conditions in the box 404, will cause the object 402 to move through undesirable states (e.g., turning upside down), or will not enable the conditions in the box 404 in a suitable manner (e.g., according to a set of terminal criteria such as a suitable time), then the possible intermediate pose may be ignored and a next possible intermediate pose may be evaluated. When a possible intermediate pose is evaluated, all variations of possible subsequent intermediate poses are also evaluated. In this manner, not only is the end state considered (e.g., the final state of the object 402 in the box 404) and the final pose of the robotic manipulator 106, but also all intermediate states of the object 402 and all intermediate poses of the robotic manipulator 106 between the initial conditions and final conditions.

In some examples, the anticipated pose space may include a plurality of anticipated final poses that would enable a subsequent interaction. For example, assume that the subsequent interaction is for the robotic manipulator 106 to pass a full coffee mug to a human user. The final pose space may include poses that include holding the coffee mug by its top, side, or handle and may include rotations of the coffee mug. Anticipated final poses that would cause the coffee to spill out of the top of the coffee mug may be removed from the final pose space. Anticipated final poses that would make handing the coffee mug off to the human user difficult or impossible may also be removed from the final pose space. Such anticipated final poses may include grasping the coffee mug by its handle. These two culling steps may result in an anticipated pose space that includes anticipated final poses that would enable the subsequent interaction. For example, an anticipated final pose may include grasping the coffee mug around its side, leaving the handle free for the human user. Another anticipated final pose may include grasping the coffee mug around its top, leaving the handle free for the human user. Movement paths between an initial state (e.g., the coffee mug resting on a surface) including an initial pose of the robotic manipulator 106 and a final state (e.g., presenting the coffee mug in a manner that the human user can accept it) including a final pose of the robotic manipulator 106 (e.g., one of the anticipated final poses) may be computed. Because there may be more than one anticipated final pose in the anticipation pose space, there may be more than one movement path computed. In some examples, a movement path that enables more than one anticipated final pose may be desirable to a movement path that enables only one anticipated final pose. This may be important when a grasping strategy is determined that enables not only more than one possible final pose for enabling a single subsequent interaction, but also enables more than one subsequent interaction. Thus, multiple subsequent interactions may each be enabled by one anticipated final pose or more than one anticipated final pose.

Figure 5:
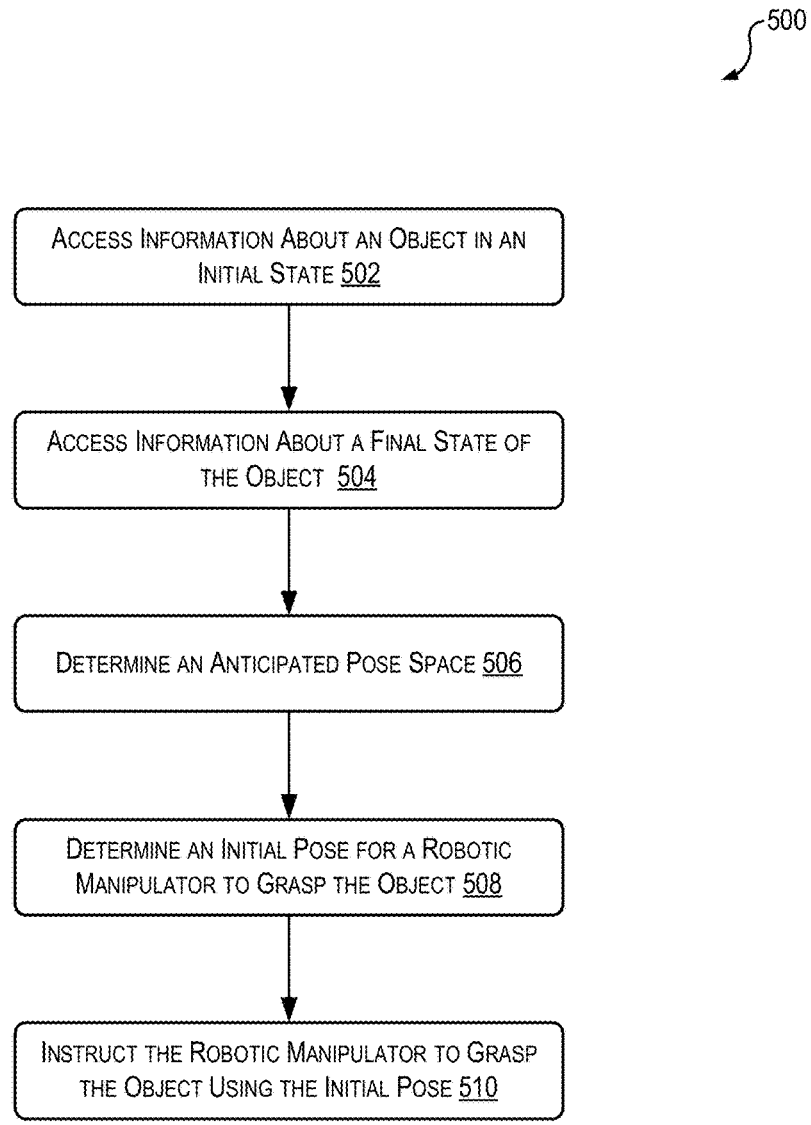
FIG. 5 illustrates a flow chart including example acts or techniques relating to determining anticipation-based grasping strategies, according to least one example.
Figure 6:
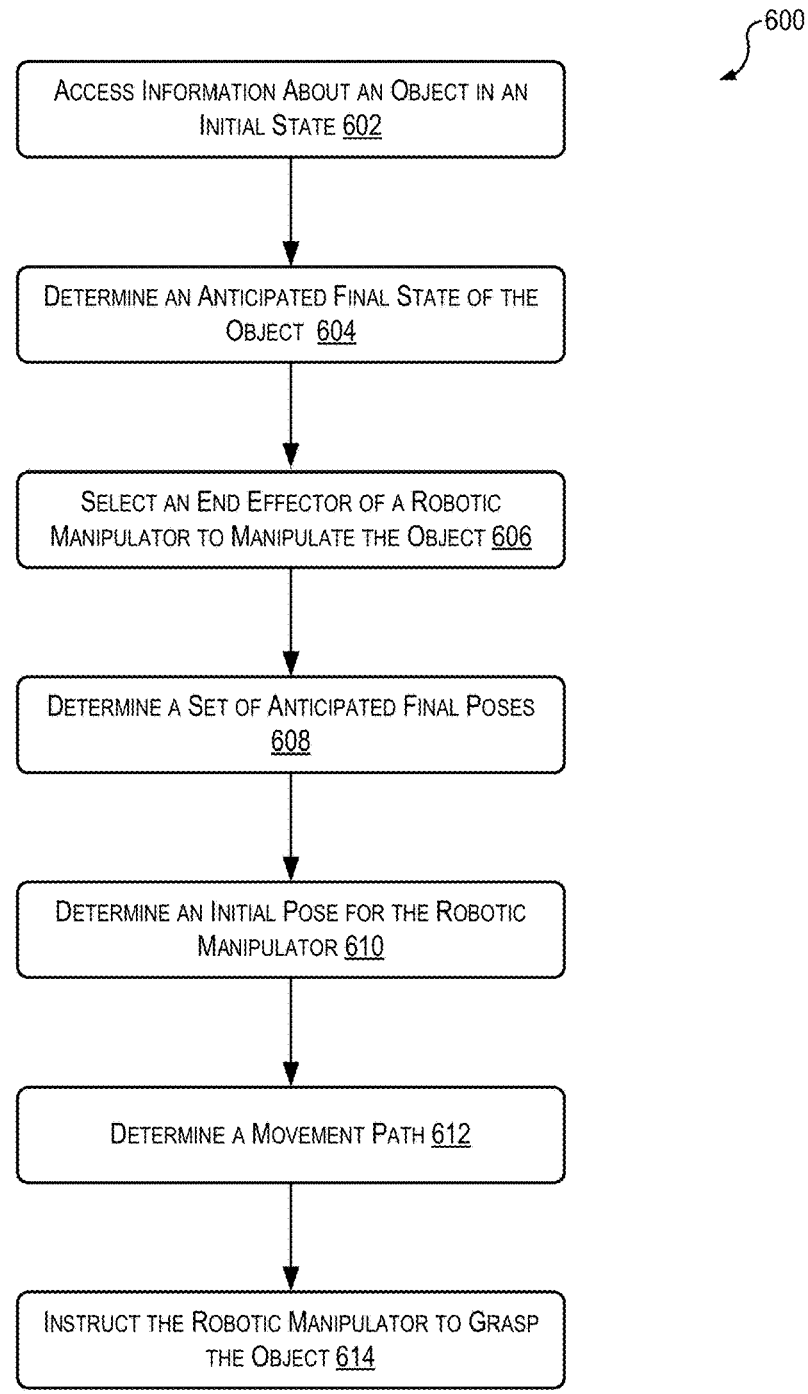
FIG. 6 illustrates a flow chart including example acts or techniques relating to determining anticipation-based grasping strategies, according to least one example.
Figure 7:
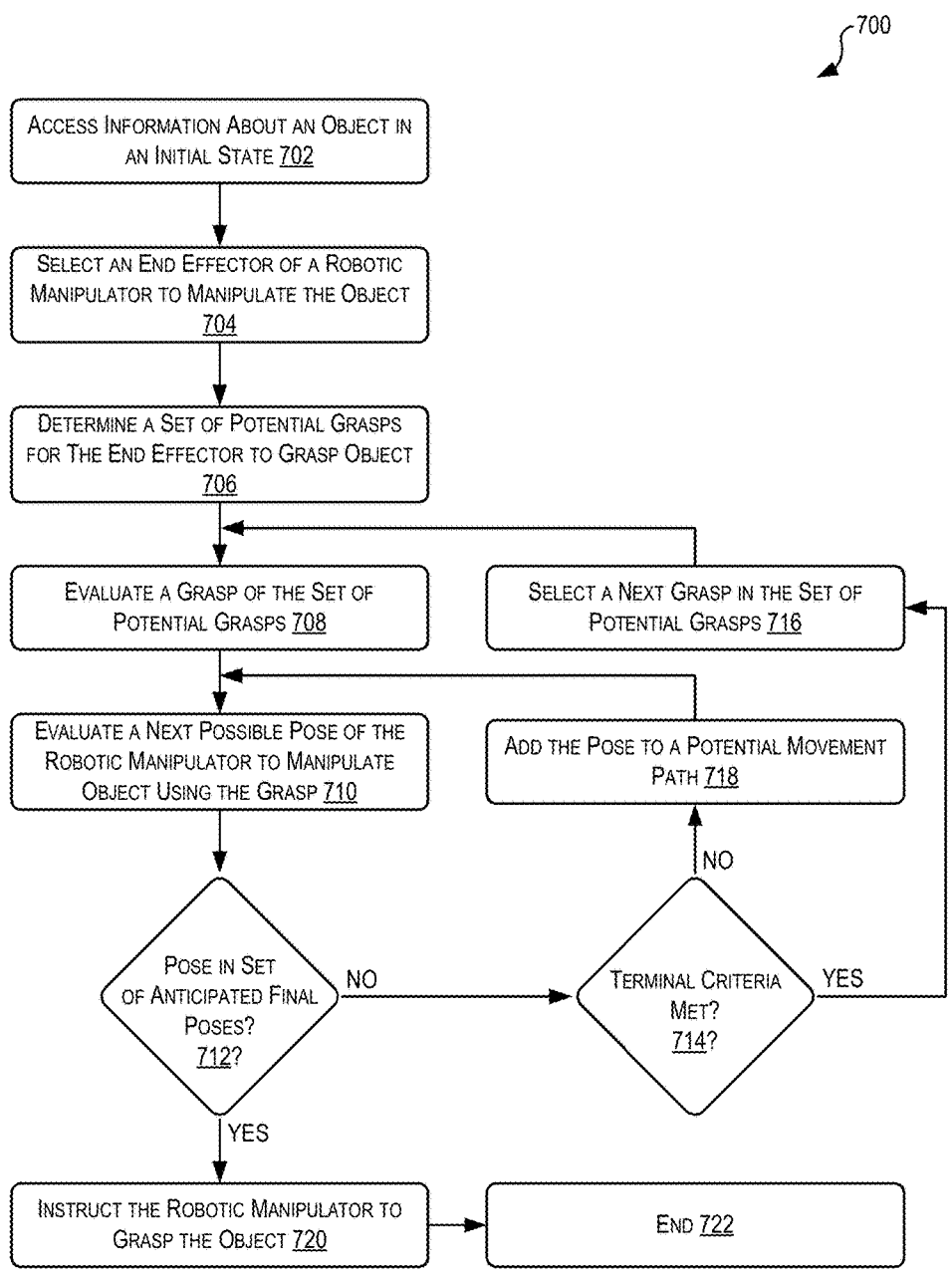
FIG. 7 illustrates a flow chart including example acts or techniques relating to determining anticipation-based grasping strategies, according to least one example.

FIGS. 5, 6, and 7 illustrate example flow diagrams showing respective processes 500, 600, and 700 as described herein. These processes 500, 600, and 700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 5 depicts the process 500 including example acts or techniques relating to determining anticipation-based grasping strategies, in accordance with at least one example. The grasp management engine 220 and/or the grasp execution engine 222 may perform the process 500 of FIG. 5.

The process 500 may begin at 502 by accessing information about an object in an initial state. This may be performed by the object state determination module 304 (FIG. 3). In some examples, accessing the information about the object can include receiving one or more images of the object in the initial state and determining the initial state based at least in part on the one or more images. The one or more images may include any suitable combination of three-dimensional images, red green blue (RGB) images, and the like. In some examples, the one or more images may include a three-dimensional image and a RGB image. The information about the object in the initial state may also be derived from pose marker fiducials associated with the object. For example, these fiducials may be applied to the object, identified from the one or more images, and used to determine the initial state of the object.

At 504, the process 500 accesses information about a final state of the object. This may be performed by the object state determination module 304. The final state may enable a subsequent interaction with the object. The subsequent interaction can include a subsequent use of the object, a placement of the object, and/or a subsequent goal of the object. The final state may include at least one of a translation or a rotation of the object by a robotic manipulator and relative to the initial state. In some examples, accessing information about the final state of object can include identifying the object as belonging to a particular class of objects, accessing a database to identify a set of possible final states for the particular class of objects, and selecting the final state from the set of possible final states based at least in part on a probability value associated with the final state. In some examples, the final state may correspond to the object being stowed in a storage structure. The information about the final state may be in terms of pose marker fiducials indicating a position of the object relative to the initial state.

At 506, the process 500 determines an anticipated pose space. This may be performed by the pose determination module 306 (FIG. 3). The anticipated pose space may be determined based at least in part on a final pose space. The anticipated pose space may enable the subsequent interaction with the object when the object is in the final state. The process 500 may also include determining the final pose space prior to determining the anticipated pose space. The final pose space may include a set of possible poses of the robotic manipulator when the object is in the final state. The anticipated pose space may include a subset of the set of possible poses (from the final pose space) of the robotic manipulator when the object is in the final state. In some examples, determining the anticipated pose space can include removing poses from the final pose space that impede the subsequent interaction with the object in the final state. In some examples, the anticipated pose space can include one or more poses of the robotic manipulator that enable the subsequent interaction with the object when the object is in the final state.

At 508, the process 500 determines an initial pose for the robotic manipulator to grasp the object in the initial state. This may be performed by the pose determination module 306. The initial pose may be determined based at least in part on the anticipated pose space. The initial pose may include an initial position and an initial orientation of the robotic manipulator.

At 510, the process 500 instructs the robotic manipulator to grasp the object using the initial pose. This may be performed by the strategy generation module 312 (FIG. 3) and/or the grasp execution engine 222 (FIG. 2). This may also include transporting the object to the final state. In some examples, the process 500 may also include determining a grasping position on the object for the robotic manipulator to grasp the object in the initial state.

The process 500 may also include, prior to instructing the robotic manipulator at 510, determining, based at least in part on the anticipated pose space and the initial pose, a movement path comprising a set of intermediate poses through which the robotic manipulator will move to transport the object from the initial state to the final state. In some examples, instructing the robotic manipulator can include instructing the robotic manipulator to transport the object in accordance with the movement path. In some examples, determining the movement path may include performance of at least a portion of the process 700.

The process 500 may also include selecting an end effector of a robotic manipulator based at least in part on one or more characteristics of the object and the final state. The selected end effector may include a grasping function capable of grasping the object while the robotic manipulator moves the object from the initial state to the final state. In some examples, instructing the robotic manipulator can include instructing the robotic manipulator to use the selected end effector to grasp the object. In some examples, the end effector can be selected from a set of end effectors associated with the robotic manipulator. For example, the robotic manipulator may have more than one end effector available for use. The set of end effectors may be independently selectable by the robotic manipulator. In some examples, more than one end effector may be used by the robotic manipulator to grasp the object and transport the object to the final state. In this case, the process 500 may select each of the end effectors that make up the set of more than one end effectors.

FIG. 6 depicts the process 600 including example acts or techniques relating to determining anticipation-based grasping strategies, in accordance with at least one example. The grasp management engine 220 and/or the grasp execution engine 222 may perform the process 600 of FIG. 6.

The process 600 may begin at 602 by accessing information about an object in an initial state. This may be performed by the object state determination module 304 (FIG. 3).

At 604, the process 600 determines an anticipated final state of the object. This may be performed by the object state determination module 304. The anticipated final state of the object may enable a subsequent interaction with the object. The subsequent interaction may include a subsequent use of the object, a placement of the object, and/or a subsequent goal of the object. In some examples, the anticipated final state can include at least one of a translation or a rotation of the object relative to the initial state. In some examples, determining the anticipated final state of the object can include selecting the anticipated final state from a set of anticipated final states based at least in part on probability scores assigned to each of the anticipated final states of the set using a probability distribution function.

At 606, the process 600 selects an end effector of a robotic manipulator to manipulate the object. This may be performed by the end effector selection module 310 (FIG. 3). The selection at 606 may be based at least in part on the information about the object and the anticipated final state. In some examples, the selected end effector can include a grasping function capable of grasping the object while the robotic manipulator moves the object from the initial state to the anticipated final state.

At 608, the process 600 determines a set of anticipated final poses. This may be performed by the pose determination module 306 (FIG. 3). The determination at 608 may be based at least in part on the anticipated final state. In some examples, each anticipated final pose can include a position and an orientation of the robotic manipulator when the object is in the anticipated final state. Each of the anticipated final poses may also enable the subsequent interaction with the object.

At 610, the process 600 determines an initial pose. This may be performed by the pose determination module 306. The determination at 610 may be based at least in part on the set of anticipated final poses. The initial pose may be for the robotic manipulator to grasp the object in the initial state using the selected end effector. The initial pose can include an initial position and an initial orientation of the robotic manipulator when the object is in the initial state.

At 612, the process 600 determines a movement path. This may be performed by the movement path generation module 308 (FIG. 3). The determination at 612 may be based at least in part on the set of anticipated final poses and the initial pose. The movement path can include a set of intermediate poses through which the robotic manipulator will move to transport the object from the initial state to the anticipated final state. In some examples, determining the movement path may include performance of at least a portion of the process 700.

At 614, the process 600 instructs the robotic manipulator to grasp the object. This may be performed by the strategy generation module 312 (FIG. 3) and/or the grasp execution engine 222 (FIG. 2). In some examples, instructing the robotic manipulator may also include instructing the robotic manipulator to use the initial pose to grasp the object and to transport the object to the final state in accordance with the movement path.

The process 600 may also include determining a grasping position on the object for the robotic manipulator to grasp the object in the initial state.

FIG. 7 depicts the process 700 including example acts or techniques relating to determining anticipation-based grasping strategies, in accordance with at least one example. In particular, the process 700 corresponds to a recursive approach to evaluating possible intermediate poses to ensure that a subsequent interaction will be enabled. A movement path may also be determined that includes an appropriate set of intermediate poses. The grasp management engine 220 and/or the grasp execution engine 222 may perform the process 700 of FIG. 7.

The process 700 may begin at 702 by accessing information about an object in an initial state. This may be performed by the object state determination module 304 (FIG. 3) as previously described herein.

At 704, the process 700 selects an end effector of a robotic manipulator to manipulate the object. This may be performed by the end effector selection module 310 (FIG. 3) as described previously herein.

At 706, the process 700 determines a set of potential grasps for the end effector to grasp the object. This may be performed by the end effector selection module 310. The set of potential grasps may be particularized to the object, the end effector, a subsequent interaction associated with the object, a final state of the object, and/or any other information. In some examples, set of potential grasps may be accessed from a set of predefined grasps.

At 708, the process 700 evaluates a grasp of the set of potential grasps. This may be performed by the pose determination module 306 (FIG. 3). Evaluating the grasp may include determining whether the grasp will enable a subsequent interaction with the object and/or enable the robotic manipulator to maintain control of the object (e.g., minimal slippage) as it manipulates the object from the initial state to the final state. In some examples, those grasps that enable the robotic manipulator to maintain control of the object during manipulation and enables the subsequent interaction may be given preference over those that either provide limited control and/or do not enable the subsequent interaction.

At 710, the process 700 evaluates a next possible pose (e.g., an initial pose, an intermediate pose, or a final pose) of the robotic manipulator to manipulate the object using the grasp. This may be performed by the movement path generation module 310 (FIG. 3). The grasp may be the grasp evaluated at 708. Evaluating the next possible pose may include evaluating an initial pose of the robotic manipulator corresponding to the initial state of the object. Evaluating the next possible pose may also include evaluating an intermediate pose of the robotic manipulator. In any event, the process 700, at 710, determines whether the next possible pose will enable the subsequent interaction. In other words, if the robotic manipulator is moved into this next possible pose, will the robotic manipulator be capable of moving the object from the initial state to the final state in a manner that enables the subsequent interaction. Or will the next possible pose put the robotic manipulator on a path of poses (e.g., movement steps) that will never result in the final state or will cause the object to go through certain undesirable intermediate states (e.g., turning a coffee mug upside down).

At 712, the process 700 determines whether the pose is in a set of anticipated final poses. This may be performed by the pose determination module 306 (FIG. 3). The pose here may be the next possible pose evaluated at 710. The set of anticipated final poses may correspond to those poses corresponding to the final state of the object and that will enable the subsequent interaction. In some examples, the set of anticipated final poses may be computed using the techniques described herein or may be accessed by the process 700. The determination at 712 includes determining whether the next possible pose is found in the set of anticipated final poses. If yes, this may mean that the next possible pose will result in the object being located in the final state. Thus, other possible poses may not need to be further evaluated. If no, this may mean that the next possible pose will not result in the object being located in the final state. In particular, if the pose is not found in the set of anticipated final poses (e.g., the answer at 712 is NO), the process 700 proceeds to 714.

At 714, the process 700 determines whether terminal criteria are met. This may be performed by the pose determination module 306. The terminal criteria may include a set of criteria used to bound the evaluation of possible poses for generating a grasping strategy. For example, the set of terminal criteria may include a maximum count criteria corresponding to a maximum number of poses for the robotic manipulator between an initial pose and a final pose, an amount of time criteria for the robotic manipulator to move the object from the initial state to the final state, an energy usage criteria for the robotic manipulator to move the object from the initial state to the final state, and any other suitable criteria that can be used to limit and/or bound the evaluation of the possible poses for the grasping strategy. If the terminal criteria are met (e.g., the answer at 714 is YES), the process 700 proceeds to 716. For example, assume that the terminal criteria sets a maximum number of intermediate poses at 75, and the process 700 determines that if the next possible pose evaluated at 710 is taken by the robotic manipulator it will take 100 additional intermediate poses to reach one of the anticipated final poses. If this is the case, the process 700 may select a next grasp in set of potential grasps at 716 and evaluate the next grasp at 708 because the terminal criteria would be met. In this manner, the process 700 recursively evaluates grasps of the robotic manipulator.

If the terminal criteria are not met (e.g., the answer at 714 is NO), the process 700 proceeds to 718 and adds the pose to a potential movement path. This may be performed by the movement path generation module 310 (FIG. 3). The movement path may be a potential movement path at this point because other poses following the pose just added will still be evaluated by the process 700. If the remaining poses are evaluated true, they too may be added to the movement path until a complete path from the initial pose to one of the anticipated final poses is determined.

After the pose is added to the potential movement path at 718, the process 700 returns and evaluates the next possible pose at 710. In this manner, the process 700 recursively evaluates poses of the robotic manipulator.

Returning to 712, if the pose is found in the set of anticipated final poses (e.g., the answer at 712 is YES), the process 700 proceeds to 720. At 720, the process 700 instructs the robotic manipulator to grasp the object using the grasp and move the object using the pose evaluated at 710. This can include moving the object from the initial state to the final state. At 722, the process 700 ends.

Figure 8:
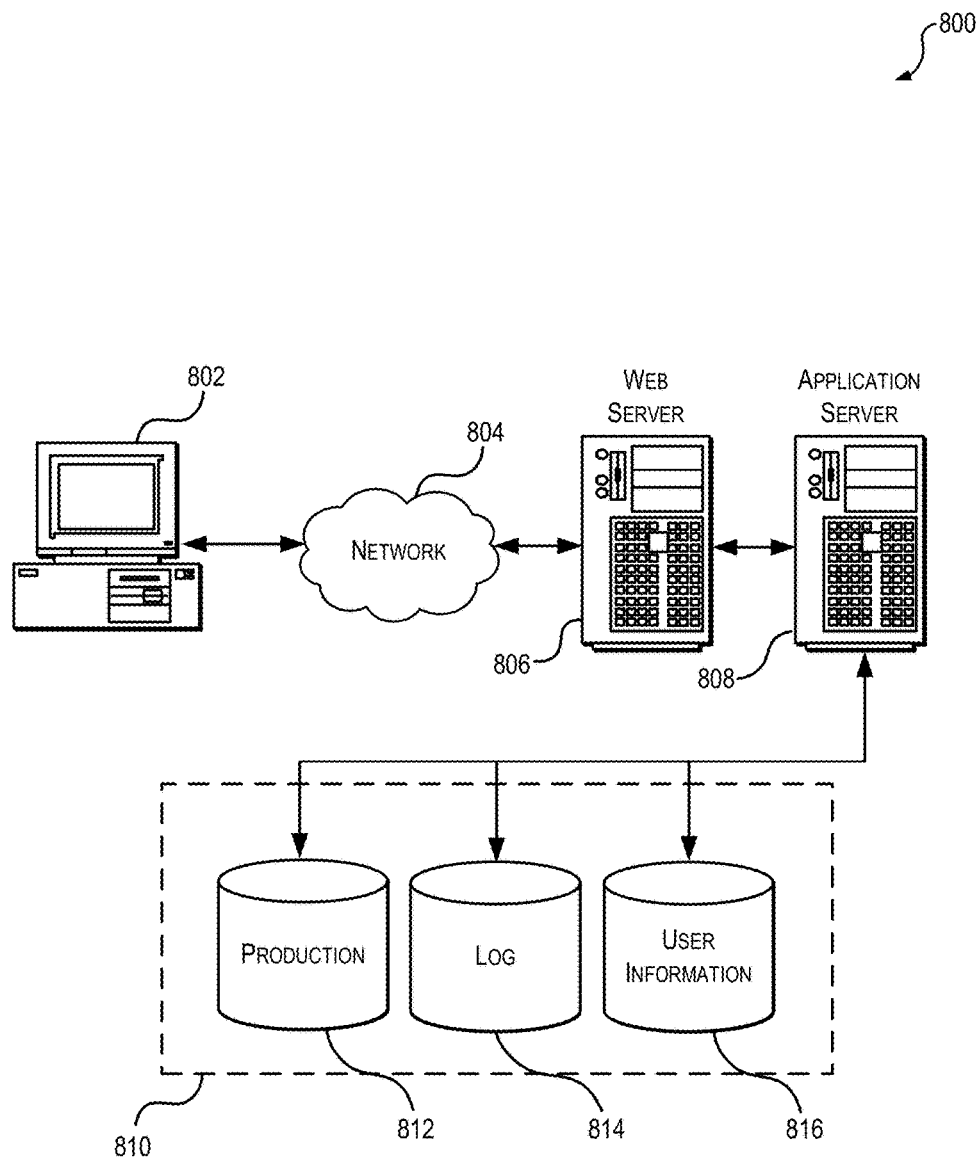
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
accessing information about an object in an initial position and an initial orientation;
accessing information about a subsequent interaction with the object, the subsequent interaction expected to be performed with respect to the object after a robotic manipulator has moved the object from the initial position and the initial orientation;
prior to an end effector of the robotic manipulator moving the object from the initial position and the initial orientation, determining an anticipated final position and an anticipated final orientation of the object based at least in part on the information about the subsequent interaction, the anticipated final position and the anticipated final orientation of the object enabling performance of the subsequent interaction with the object and comprising at least one of a translation or a rotation of the object relative to the initial position and the initial orientation;
selecting the end effector of the robotic manipulator based at least in part on the information about the object and the anticipated final position and the anticipated final orientation, the selected end effector comprising a grasping function capable of grasping the object while the robotic manipulator transports the object from the initial position and the initial orientation to the anticipated final position and the anticipated final orientation;
determining, based at least in part on the anticipated final position and the anticipated final orientation, a set of anticipated final poses for the robotic manipulator, each of the anticipated final poses comprising a position and an orientation of the robotic manipulator when the object is in the anticipated final position and the anticipated final orientation, and enabling the subsequent interaction with the object;
determining, based at least in part on the set of anticipated final poses, an initial pose for the robotic manipulator to grasp the object in the initial position and the initial orientation using the selected end effector, the initial pose comprising an initial pose position and an initial pose orientation of the robotic manipulator when the object is in the initial position and the initial orientation;
determining, based at least in part on the set of anticipated final poses and the initial pose, a movement path comprising a set of intermediate poses through which the robotic manipulator will move to transport the object from the initial position and the initial orientation to the anticipated final position and the anticipated final orientation; and
instructing the robotic manipulator to grasp the object using the initial pose and to transport the object to the anticipated final position and the anticipated final orientation in accordance with the movement path.

2. The computer-implemented method of claim 1, further comprising determining a grasping position on the object for the robotic manipulator to grasp the object in the initial position and the initial orientation.

3. The computer-implemented method of claim 1, wherein determining the anticipated final position and the anticipated final orientation of the object comprises selecting the anticipated final position and the anticipated final orientation from a set of anticipated final positions and a set of anticipated final orientations based at least in part on probability values assigned to each of the anticipated final positions of the set of anticipated final positions and to each of the anticipated final orientations of the set of anticipated final orientations using a probability distribution function.

4. The computer-implemented method of claim 1, wherein the subsequent interaction comprises a subsequent use of the object, a subsequent placement of the object, or a subsequent goal of the object.

5. A computer-implemented method, comprising:
accessing information about an object in an initial position and an initial orientation;
accessing information about a subsequent interaction with the object, the subsequent interaction expected to be performed with respect to the object after a robotic manipulator has moved the object from the initial position and the initial orientation;
prior to the robotic manipulator moving the object from the initial position and the initial orientation, determining a final position and a final orientation of the object based at least in part on the information about the subsequent interaction, the final position and the final orientation of the object enabling performance of the subsequent interaction with the object and comprising at least one of a translation or a rotation of the object by a robotic manipulator relative to the initial position and the initial orientation;
determining, based at least in part on a final pose space, an anticipated pose space that enables the subsequent interaction with the object when the object is in the final position and the final orientation, the final pose space comprising a set of possible poses of the robotic manipulator when the object is in the final position and the final orientation, the anticipated pose space comprising a subset of the set of possible poses of the robotic manipulator when the object is in the final position and the final orientation;
determining, based at least in part on the anticipated pose space, an initial pose for the robotic manipulator to grasp the object in the initial position and the initial orientation, the initial pose comprising an initial pose position and an initial pose orientation of the robotic manipulator; and
instructing the robotic manipulator to grasp the object using the initial pose and to transport the object to the final position and the final orientation.

6. The computer-implemented method of claim 5, wherein accessing the information about the object comprises:
receiving one or more images of the object in the initial position and the initial orientation; and
determining the initial position and the initial orientation based at least in part on the one or more images.

7. The computer-implemented method of claim 5, further comprising determining a grasping position on the object for the robotic manipulator to grasp the object in the initial position and the initial orientation.

8. The computer-implemented method of claim 5, wherein determining the final position and the final orientation of the object comprises:
   identifying the object as belonging to a particular class of objects;
   accessing a database to identify a set of possible final positions and a set of final orientations for the particular class of objects; and
   selecting the final position and the final orientation from the set of possible final positions and the set of final orientations based at least in part on a probability value associated with the final position and the final orientation.

9. The computer-implemented method of claim 5, wherein determining the initial pose for the robotic manipulator comprises selecting the initial pose from among the subset of the set of possible poses.

10. The computer-implemented method of claim 5, wherein determining the anticipated pose space comprises removing one or more possible poses from the set of possible poses that impede the subsequent interaction with the object in the final position and the final orientation.

11. The computer-implemented method of claim 5, wherein:
   the method further comprises, prior to instructing the robotic manipulator, determining, based at least in part on the anticipated pose space and the initial pose, a movement path comprising a set of intermediate poses through which the robotic manipulator will move to transport the object from the initial position and the initial orientation to the final position and the final orientation; and
   instructing the robotic manipulator comprises instructing the robotic manipulator to transport the object in accordance with the movement path.

12. The computer-implemented method of claim 11, wherein determining the movement path comprising the set of intermediate poses comprises recursively evaluating possible intermediate poses of a set of possible intermediate poses to identify intermediate poses of the set of intermediate poses.

13. The computer-implemented method of claim 11, wherein:
   the method further comprises selecting an end effector of the robotic manipulator from a set of end effectors associated with the robotic manipulator based at least in part on one or more characteristics of the object and the final position and the final orientation, the selected end effector comprising a grasping function capable of grasping the object while the robotic manipulator moves the object from the initial position and the initial orientation to the final position and the final orientation; and
   instructing the robotic manipulator comprises instructing the robotic manipulator to use the selected end effector to grasp the object.

14. The computer-implemented method of claim 5, wherein each possible pose of the subset of possible poses enable the subsequent interaction with the object when the object is in the final position and the final orientation.

15. The computer-implemented method of claim 5, wherein the subsequent interaction comprises a subsequent use of the object, a subsequent placement of the object, or a subsequent goal of the object.

16. The computer-implemented method of claim 5, wherein the final position and the final orientation correspond to the object being stowed in a storage structure.

17. A system, comprising:
   a robotic manipulator comprising at least one end effector; and
   a computing device in communication with the robotic manipulator and configured to at least:
      access information about an object in an initial position and an initial orientation;
      access information about a subsequent interaction with the object, the subsequent interaction expected to be performed with respect to the object after a robotic manipulator has moved the object from the initial position and the initial orientation;
      prior to the robotic manipulator moving the object from the initial position and the initial orientation, determine a final position and a final orientation of the object based at least in part on the information about the subsequent interaction, the final position and the final orientation of the object enabling performance of the subsequent interaction with the object and comprising at least one of a translation or a rotation of the object by the robotic manipulator and relative to the initial position and the initial orientation;
      determine an anticipated final pose of the robotic manipulator corresponding to the final position and the final orientation of the object;
      determine, based at least in part on the anticipated final pose, an initial pose for the robotic manipulator to grasp the object in the initial position and the initial orientation, the initial pose comprising an initial pose position and an initial pose orientation of the robotic manipulator; and
      instruct the robotic manipulator to grasp the object using the initial pose.

18. The system of claim 17, wherein:
   the robotic manipulator comprises a set of end effectors that includes the at least one end effector; and
   the computing device is further configured to select an end effector from the set of end effectors to grasp the object in the initial position and the initial orientation.

19. The system of claim 17, wherein the anticipated final pose of the robotic manipulator enables performance of the subsequent interaction with the object when the object is in the final position and the final orientation.

20. The system of claim 17, wherein the computing device is further configured to determine a movement path of the robotic manipulator for transporting the object between the initial position and the initial orientation to the final position and the final orientation, the movement path comprising one or more movement parameters for operating the robotic manipulator.

* * * * *